(12) United States Patent
Ishihara

(10) Patent No.: US 10,521,054 B2
(45) Date of Patent: Dec. 31, 2019

(54) PROJECTION DISPLAY UNIT

(71) Applicant: SONY CORPORATION, Tokyo (JP)

(72) Inventor: Hajime Ishihara, Ibaraki (JP)

(73) Assignee: SONY CORPORATION, Tokyo (JP)

(*) Notice: Subject to any disclaimer, the term of this patent is extended or adjusted under 35 U.S.C. 154(b) by 257 days.

(21) Appl. No.: 15/535,112

(22) PCT Filed: Nov. 16, 2015

(86) PCT No.: PCT/JP2015/082069
§ 371 (c)(1),
(2) Date: Jun. 12, 2017

(87) PCT Pub. No.: WO2016/103969
PCT Pub. Date: Jun. 30, 2016

(65) Prior Publication Data
US 2017/0329459 A1    Nov. 16, 2017

(30) Foreign Application Priority Data

Dec. 25, 2014   (JP) .................. 2014-261929

(51) Int. Cl.
*G06F 3/042* (2006.01)
*G03B 21/00* (2006.01)
(Continued)

(52) U.S. Cl.
CPC .......... *G06F 3/0425* (2013.01); *G03B 17/54* (2013.01); *G03B 21/008* (2013.01);
(Continued)

(58) Field of Classification Search
None
See application file for complete search history.

(56) References Cited

U.S. PATENT DOCUMENTS 8,246,172 B2   8/2012  Amano
8,373,678 B2   2/2013  Yamada
(Continued)

FOREIGN PATENT DOCUMENTS

AT      518366 T        8/2011
AU      2003238660 A1   1/2004
(Continued)

OTHER PUBLICATIONS

International Search Report and Written Opinion of PCT Application No. PCT/JP2015/082069, dated Jan. 26, 2016, 02 pages of English Translation and 09 pages of ISRWO.

*Primary Examiner* — Kenneth B Lee, Jr.
(74) *Attorney, Agent, or Firm* — Chip Law Group

(57) ABSTRACT

A projection display unit includes, in a housing, a visible light illuminator, a light valve that modulates a first polarized component included in light outputted from the visible light illuminator, on a basis of an image signal, a projection lens that projects light modulated by the light valve onto a projection plane, a detection light-source section that outputs invisible light for detection, and an imaging device that receives a second polarized component included in light that is based on the invisible light. The detection light-source section is movable relative to the housing, and outputs the invisible light in a direction parallel to or a direction forming a fixed angle with respect to the projection plane.

19 Claims, 13 Drawing Sheets

(51) Int. Cl.
  *H04N 9/31* (2006.01)
  *G03B 17/54* (2006.01)
  *G03B 21/20* (2006.01)
  *G03B 21/26* (2006.01)

(52) U.S. Cl.
  CPC ......... *G03B 21/2073* (2013.01); *G03B 21/26* (2013.01); *H04N 9/3108* (2013.01); *H04N 9/3167* (2013.01); *H04N 9/3194* (2013.01)

(56) References Cited

U.S. PATENT DOCUMENTS

| | | |
|---|---|---|
| 2004/0207732 A1 | 10/2004 | Lieberman et al. |
| 2009/0027571 A1 | 1/2009 | Amano |
| 2009/0262098 A1 | 10/2009 | Yamada |
| 2012/0313910 A1* | 12/2012 | Haraguchi ........... H04N 9/3179 345/207 |

FOREIGN PATENT DOCUMENTS

| | | |
|---|---|---|
| CA | 2490292 A1 | 1/2004 |
| CN | 1666248 A | 9/2005 |
| CN | 101571776 A | 11/2009 |
| EP | 1540641 A2 | 6/2005 |
| EP | 1990995 A1 | 11/2008 |
| EP | 2120455 A1 | 11/2009 |
| JP | 2005-533463 A | 11/2005 |
| JP | 2007-052218 A | 3/2007 |
| JP | 2007052218 A * | 3/2007 |
| JP | 2007-235470 A | 9/2007 |
| JP | 2009-258569 A | 11/2009 |
| JP | 2012-083871 A | 4/2012 |
| JP | 2012083871 A * | 4/2012 |
| JP | 2012-256000 A | 12/2012 |
| JP | 2013-120586 A | 6/2013 |
| JP | 2013120586 A * | 6/2013 |
| JP | 2013-148802 A | 8/2013 |
| WO | 2004/003656 A2 | 1/2004 |
| WO | 2007/102339 A1 | 9/2007 |

* cited by examiner

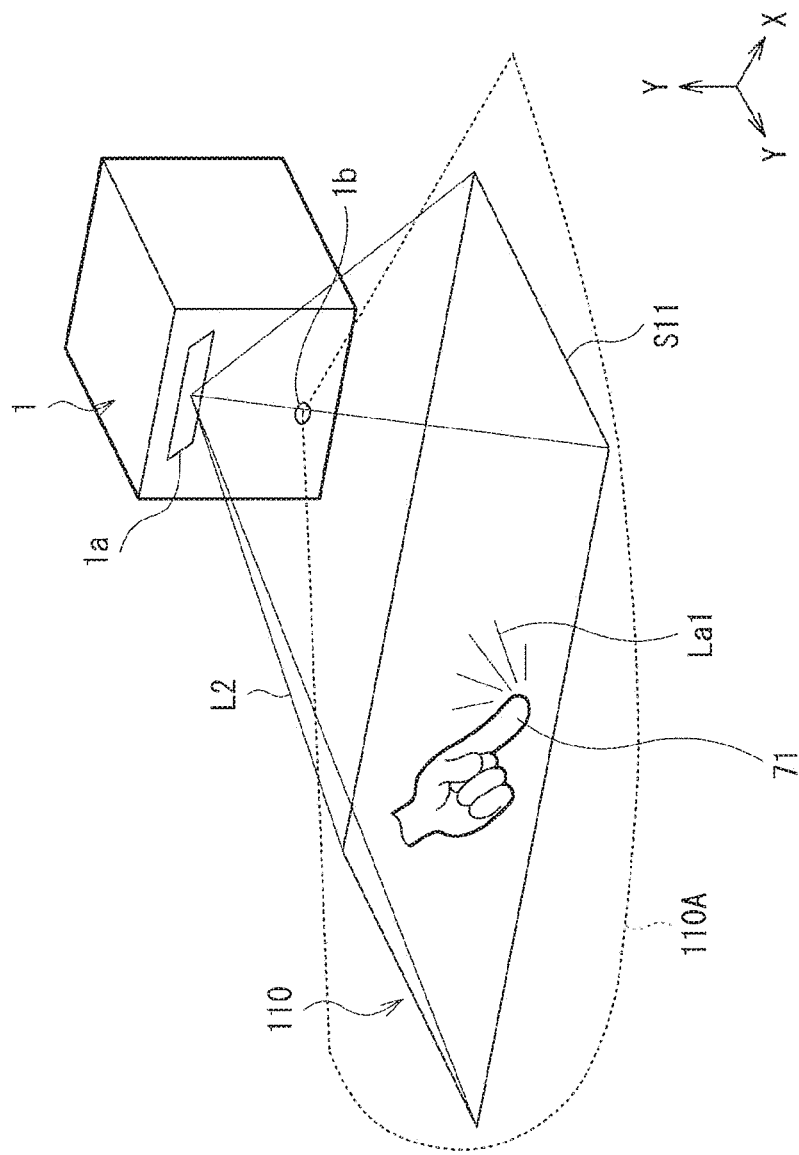
[FIG. 1]

[ FIG. 2A ]
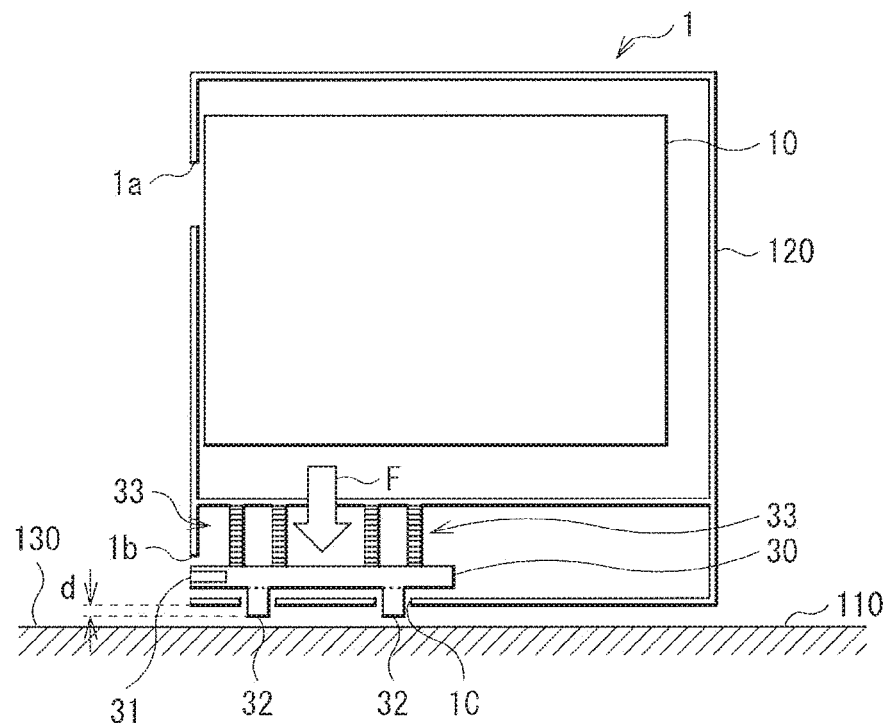
[ FIG. 2B ]
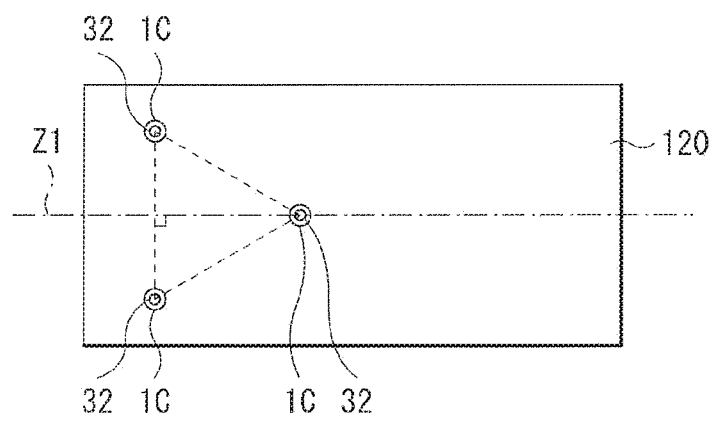

[ FIG. 2C ]
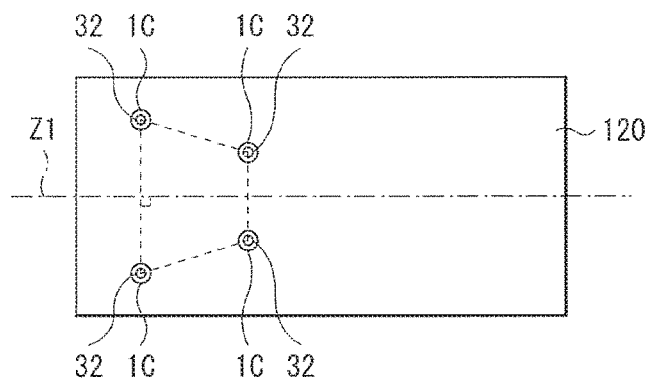
[ FIG. 3 ]
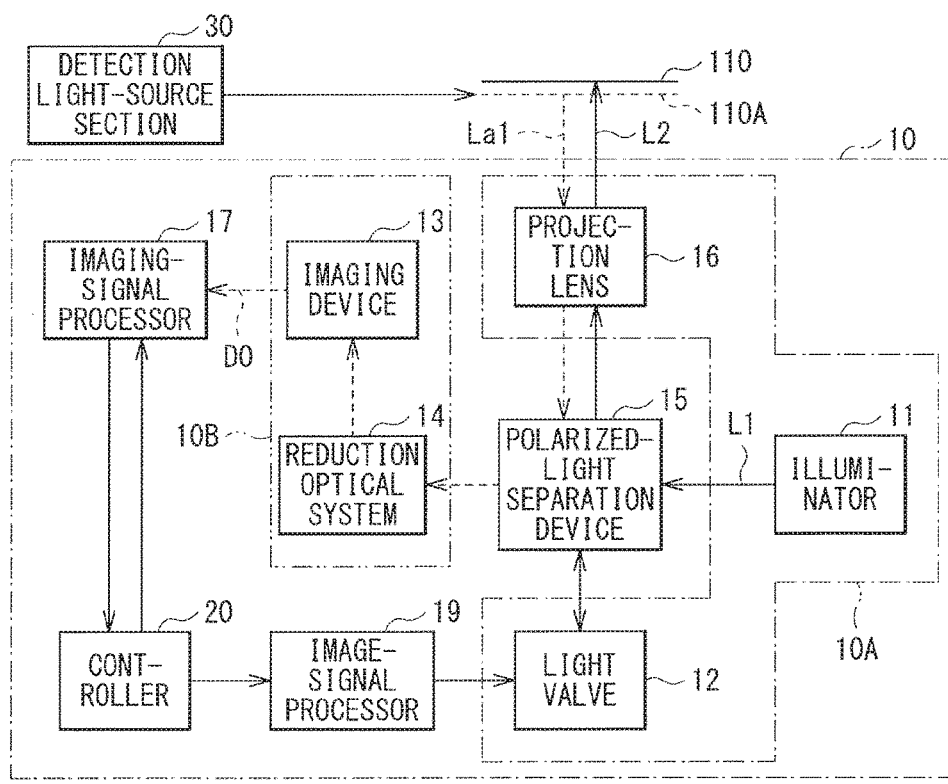

[ FIG. 4 ]
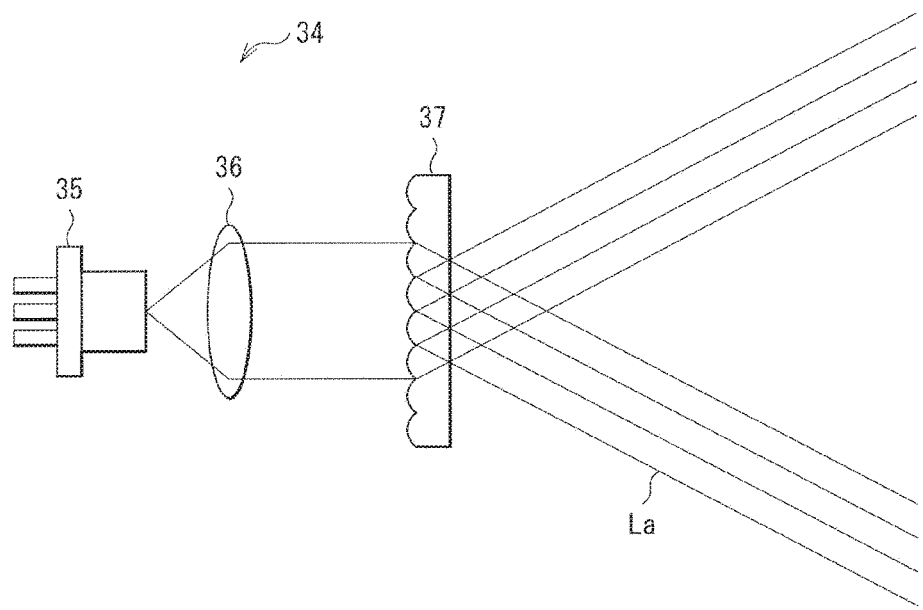
[ FIG. 5A ]
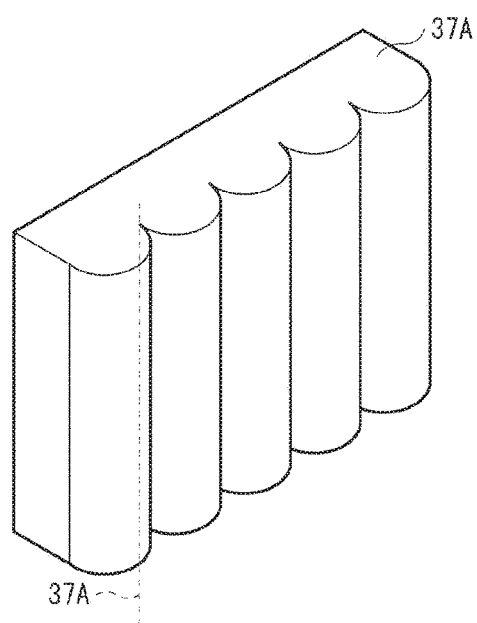

[ FIG. 5B ]
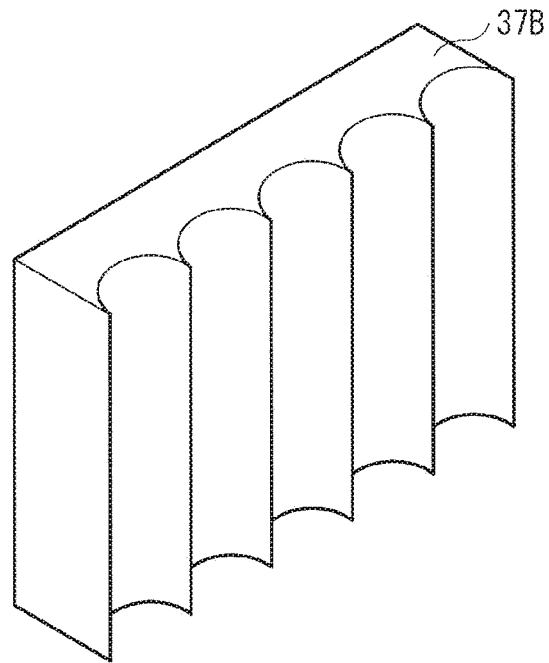
[ FIG. 6 ]
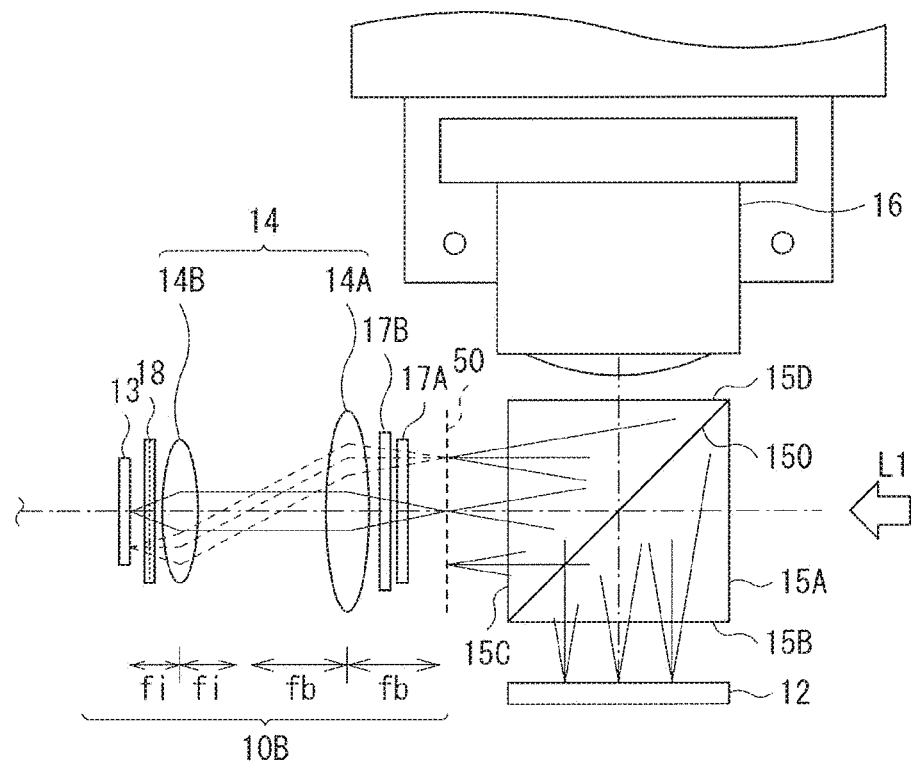

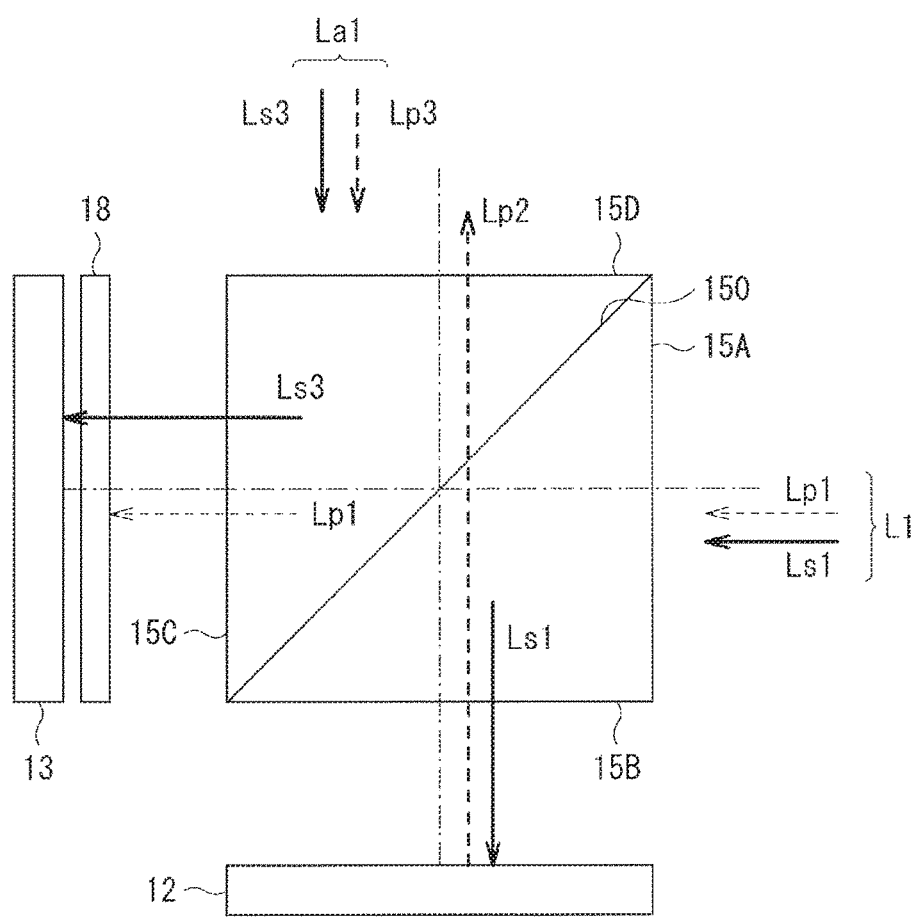
[FIG. 7]

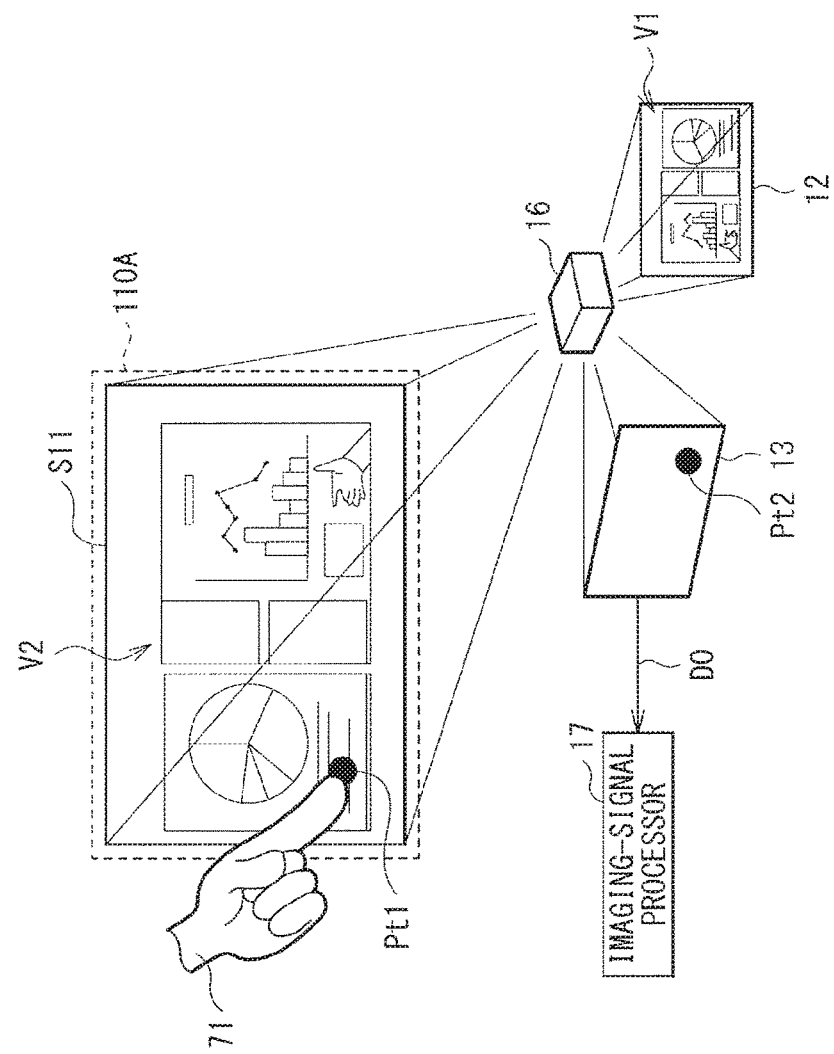

[ FIG. 9 ]
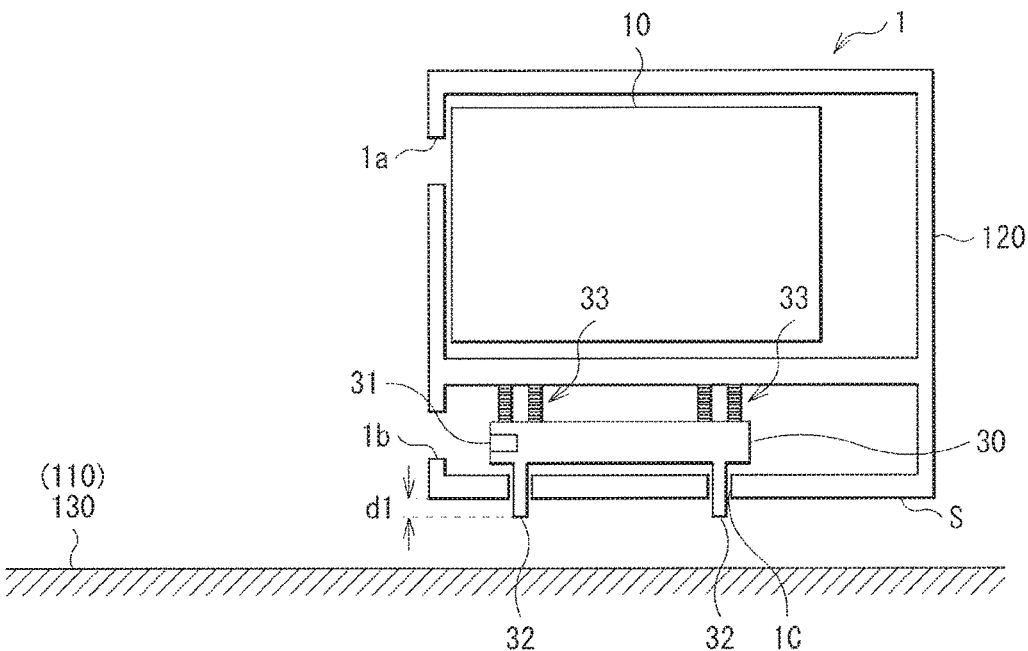
[ FIG. 10 ]
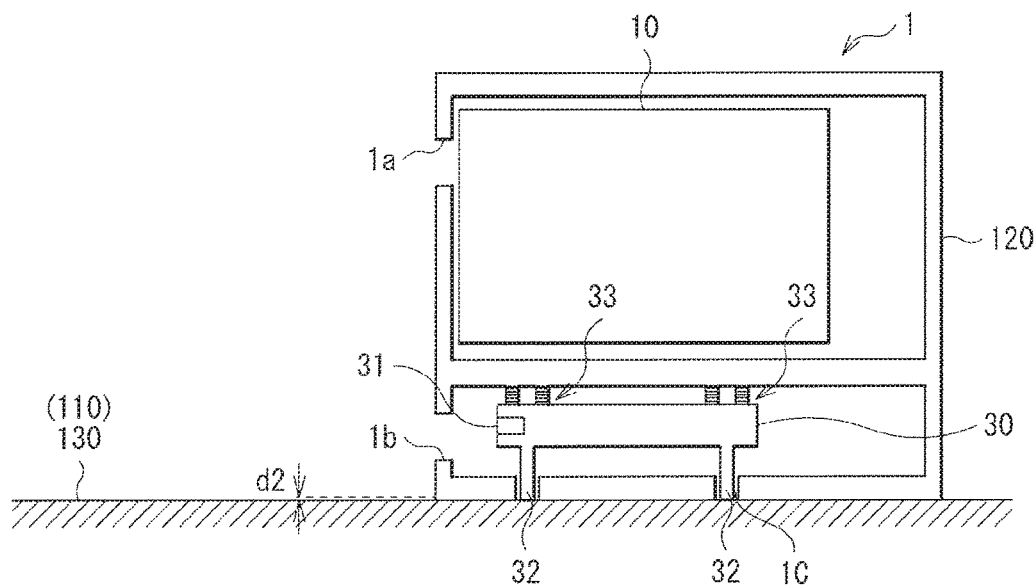

[FIG. 11]
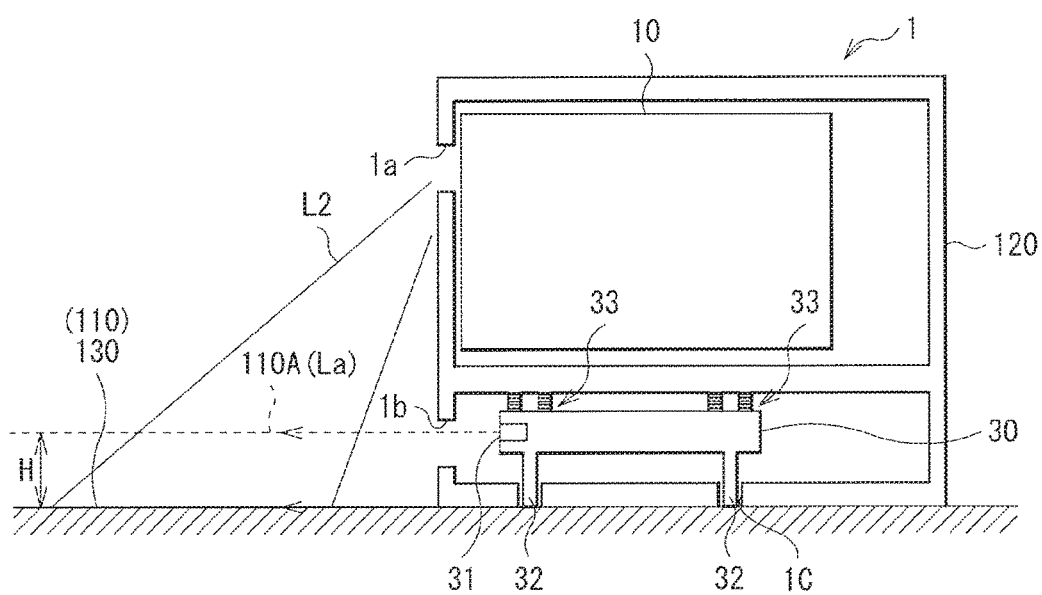

[FIG. 12A]
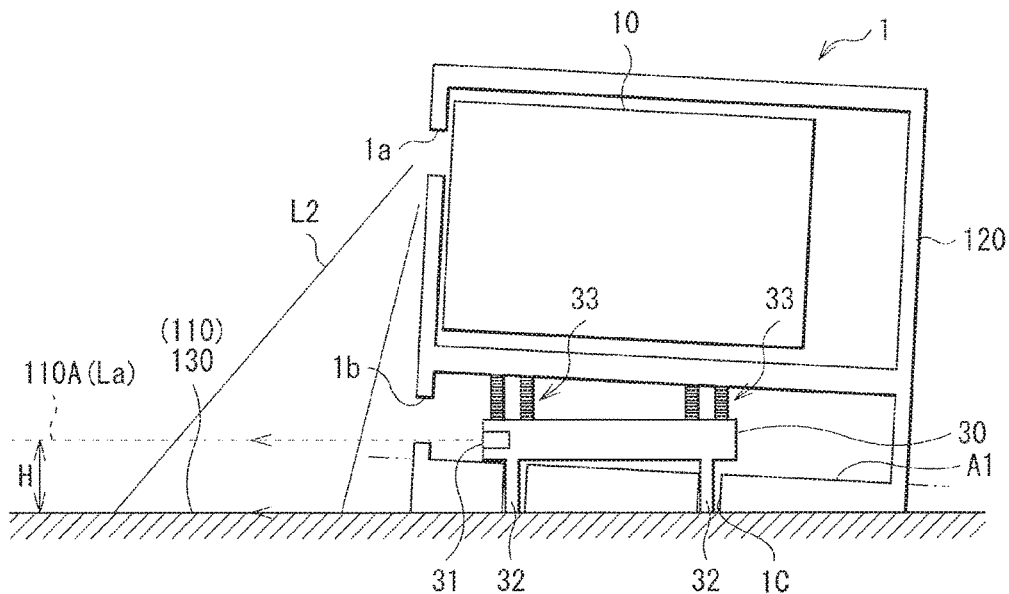
[FIG. 12B]
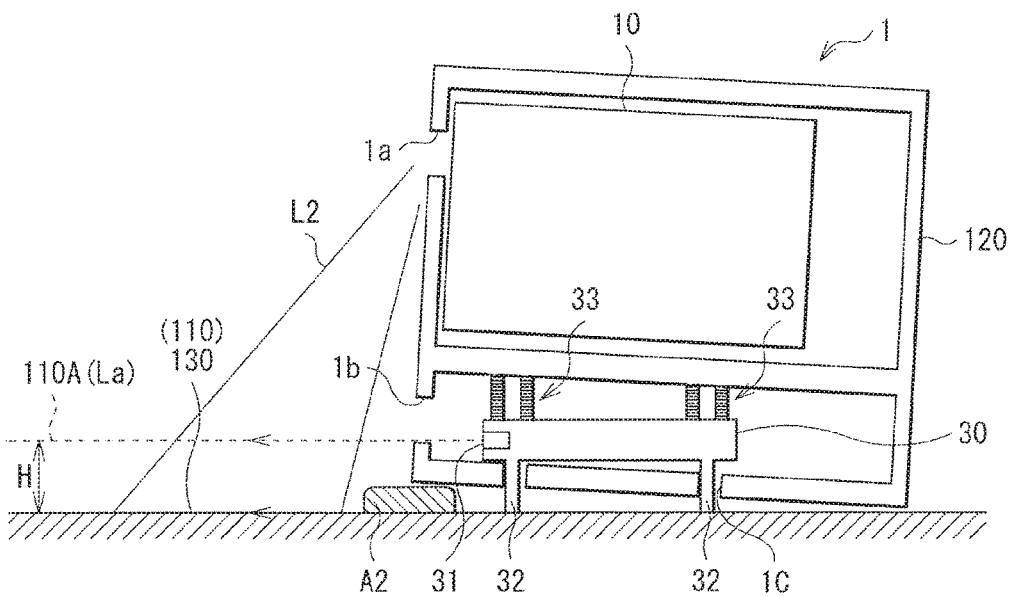

[ FIG. 13A ]
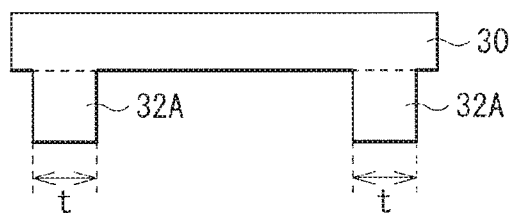
[ FIG. 13B ]
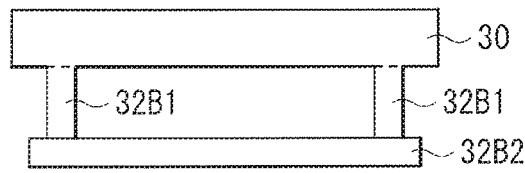
[ FIG. 13C ]
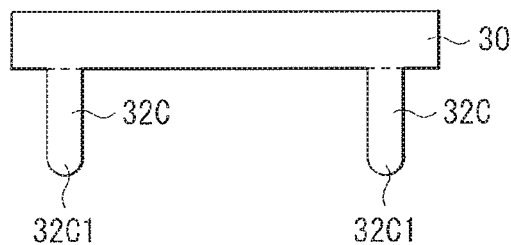

[ FIG. 14 ]
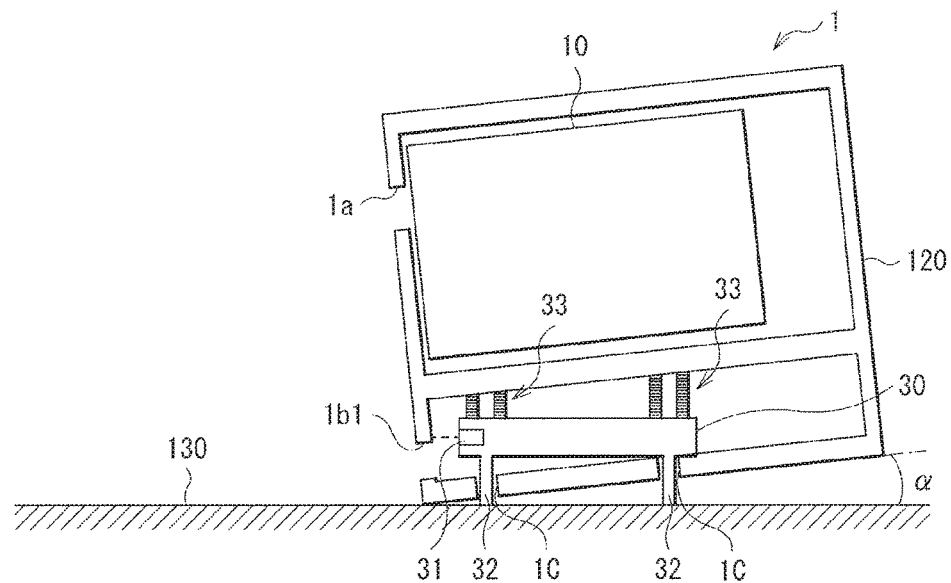
[ FIG. 15 ]
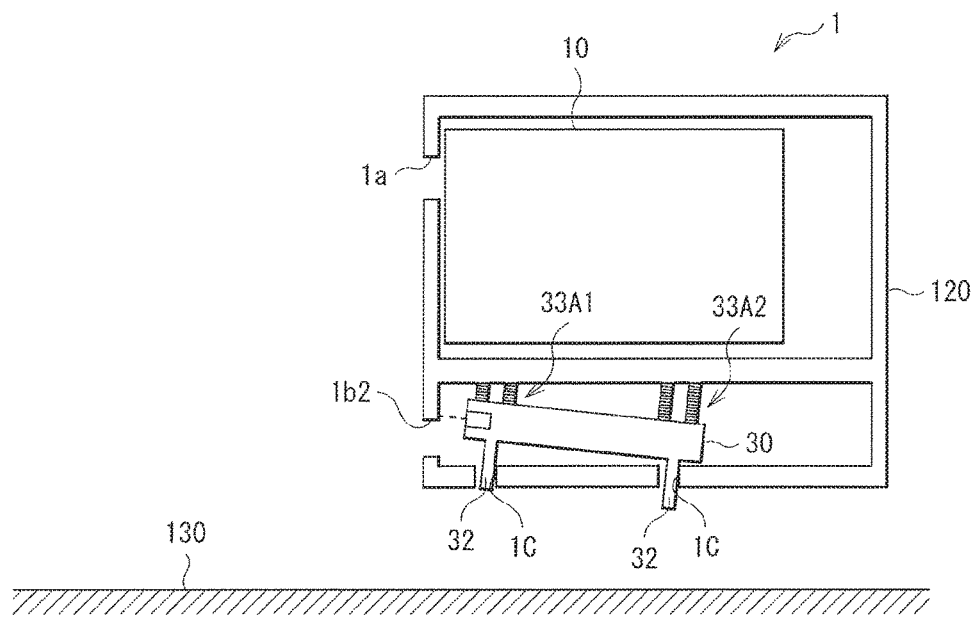

[ FIG. 16 ]
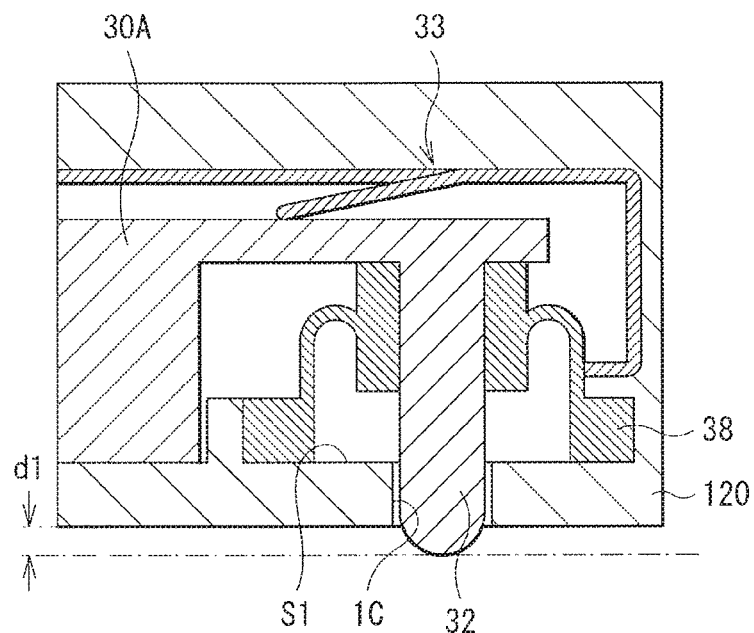
[ FIG. 17 ]
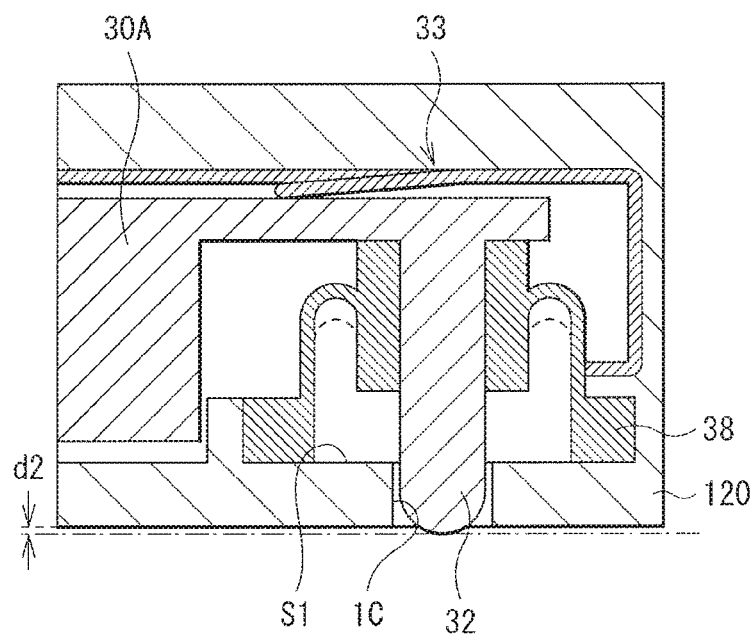

PROJECTION DISPLAY UNIT

CROSS REFERENCE TO RELATED APPLICATIONS

This application is a U.S. National Phase of International Patent Application No. PCT/JP2015/082069 filed on Nov. 16, 2015, which claims priority benefit of Japanese Patent Application No. JP 2014-261929 filed in the Japan Patent Office on Dec. 25, 2014. Each of the above-referenced applications is hereby incorporated herein by reference in its entirety.

TECHNICAL FIELD

The disclosure relates to a projection display unit having a detection function.

BACKGROUND ART

In recent years, touch panels have been used in apparatuses such as smartphones and tablet terminals. A touch panel allows a person to perform page turning, enlarging, and reducing of an image displayed on a screen with a pointing operation in accordance with intuition of the person. Meanwhile, projectors (projection display units) have been known for a long time, as a display unit that displays an image by projecting the image onto a screen. Techniques of adding a detection function such as a touch panel to a projector have been proposed (for example, PTL 1 and PTL 2).

CITATION LIST

Patent Literature

PTL 1: Japanese Unexamined Patent Application Publication No. 2007-52218
PTL 2: Japanese Unexamined Patent Application Publication No. 2003-44839

SUMMARY OF THE INVENTION

With the above-described type of projector, it is possible to perform input operation by directly touching an image projected on a projection plane with a finger (touch input operation). In such a projector, light for detection is radiated to, for example, a region in proximity to the projection plane. A light source module that outputs detection light is attached to a housing of an apparatus.

Here, the detection light is radiated, for example, along a plane parallel to the projection plane. However, a radiation direction of the detection light depends on an attachment accuracy between the light source module and the housing, or a dimensional accuracy of each component. For this reason, manufacturing is performed considering variations in these kinds of accuracy.

However, this manufacturing technique demands precise management of dimensions of components, thereby leading to a reduction in yield and an increase in cost. In addition, if an adjustment work is added to an attachment stage, the number of processes increases. Besides, the number of components that causes such variations in accuracy is large, and therefore the adjustment work is difficult.

It is therefore desirable to provide a projection display unit that makes it possible to simplify a manufacturing process and to enhance yield.

A first projection display unit according to one embodiment of the disclosure includes, in a housing: a visible light illuminator; a light valve that modulates a first polarized component included in light outputted from the visible light illuminator, on a basis of an image signal; a projection lens that projects light modulated by the light valve onto a projection plane; a detection light-source section that outputs invisible light for detection; and an imaging device that receives a second polarized component included in light that is based on the invisible light. The detection light-source section is movable relative to the housing, and outputs the invisible light in a direction parallel to the projection plane or a direction forming a fixed angle with respect to the projection plane.

In the first projection display unit according to the one embodiment of the disclosure, an object detection is performed using the invisible light radiated from the detection light-source section, while an image is displayed on the projection plane by using visible light. The detection light-source section is movable relative to the housing, and outputs the invisible light in the direction parallel to the projection plane or the direction forming the fixed angle with respect to the projection plane. This makes it easy to radiate the invisible light in a desirable direction, without considering an attachment accuracy between the housing and the detection light-source section, in a manufacturing process.

A second projection display unit according to one embodiment of the disclosure includes, in a housing: a visible light illuminator; a light valve that modulates a first polarized component included in light outputted from the visible light illuminator, on a basis of an image signal; a projection lens that projects light modulated by the light valve onto a projection plane; a detection light-source section that outputs invisible light for detection; an imaging device that receives a second polarized component included in light that is based on the invisible light; and an optical-path conversion device that converts an optical path of the invisible light outputted from the detection light-source section. The optical-path conversion device is movable relative to the housing, and outputs the invisible light in a direction parallel to the projection plane or a direction forming a fixed angle with respect to the projection plane.

In the second projection display unit according to the one embodiment of the disclosure, an object detection is performed using the invisible light radiated from the detection light-source section, while an image is displayed on the projection plane by using visible light. The optical-path conversion device is movable relative to the housing, and outputs the invisible light in the direction parallel to the projection plane or the direction forming the fixed angle with respect to the projection plane. This makes it easy to radiate the invisible light in a desirable direction, without considering an attachment accuracy between the housing and the detection light-source section, in a manufacturing process.

According to the first projection display unit in the one embodiment of the disclosure, it is possible to detect, for example, a touch input by using the invisible light radiated from the detection light-source section, while displaying an image on the projection plane by using the visible light. The detection light-source section is movable relative to the housing, and outputs the invisible light in the direction parallel to the projection plane or the direction forming the fixed angle with respect to the projection plane. This makes it easy to radiate the invisible light in a desirable direction, without considering an attachment accuracy between the housing and the detection light-source section, in a manufacturing process. It is therefore possible to simplify the manufacturing process and to enhance yield.

According to the second projection display unit in the one embodiment of the disclosure, it is possible to detect, for example, a touch input by using the invisible light radiated from the detection light-source section, while displaying an image on the projection plane by using the visible light. The optical-path conversion device is movable relative to the housing, and outputs the invisible light in the direction parallel to the projection plane or the direction forming the fixed angle with respect to the projection plane. This makes it easy to radiate the invisible light in a desirable direction, without considering an attachment accuracy between the housing and the detection light-source section, in a manufacturing process. It is therefore possible to simplify the manufacturing process and to enhance yield.

It is to be noted that mere examples of the disclosure are described above. Effects of the disclosure are not limited to those described above, and may be other effects, or may further include other effects.

BRIEF DESCRIPTION OF THE DRAWINGS

FIG. 1 is a schematic diagram illustrating an appearance and a use state of a projection display unit according to an embodiment of the disclosure.

FIG. 2A is a schematic diagram illustrating a configuration of inside of the projection display unit illustrated in FIG. 1.

FIG. 2B is a schematic diagram illustrating a configuration example of an undersurface of the projection display unit illustrated in FIG. 2A.

FIG. 2C is a schematic diagram illustrating a configuration example of the undersurface of the projection display unit illustrated in FIG. 2A.

FIG. 3 is a functional block diagram of the projection display unit illustrated in FIG. 1.

FIG. 4 is a diagram illustrating a configuration example of an infrared-ray irradiator.

FIG. 5A is a perspective view of a first configuration example of a cylindrical array lens.

FIG. 5B is a perspective view of a second configuration example of the cylindrical array lens.

FIG. 6 is a diagram illustrating a key-part configuration of a main body illustrated in FIGS. 2A, 2B and 2C.

FIG. 7 is a schematic diagram illustrating a configuration example of a polarized-light separation device, together with a state of entering light and output light.

FIG. 8 is a diagram schematically illustrating a concept of image display and object detection of the projection display unit illustrated in FIG. 1.

FIG. 9 is a schematic diagram illustrating an example of an uninstalled state (a state of being away from an installation surface) of the projection display unit illustrated in FIG. 1.

FIG. 10 is a schematic diagram illustrating an example of an installed state (a state of being placed on the installation surface) of the projection display unit illustrated in FIG. 1.

FIG. 11 is a schematic diagram illustrating a use state of the projection display unit illustrated in FIG. 1.

FIG. 12A is a schematic diagram for description of an effect of the projection display unit illustrated in FIG. 1.

FIG. 12B is a schematic diagram for description of the effect of the projection display unit illustrated in FIG. 1.

FIG. 13A is a schematic diagram illustrating a configuration of a protrusion of a detection light-source section according to a modification example 1-1.

FIG. 13B is a schematic diagram illustrating a configuration of a protrusion of a detection light-source section according to a modification example 1-2.

FIG. 13C is a schematic diagram illustrating a configuration of a protrusion of a detection light-source section according to a modification example 1-3.

FIG. 14 is a schematic diagram illustrating a configuration of a projection display unit according to a modification example 2.

FIG. 15 is a schematic diagram illustrating a configuration of a projection display unit according to a modification example 3.

FIG. 16 is a schematic diagram illustrating a configuration of a portion near a protrusion in an uninstalled state of a projection display unit according to a modification example 4.

FIG. 17 is a schematic diagram illustrating a configuration of the portion near the protrusion in an installed state of the projection display unit according to the modification example 4.

MODES FOR CARRYING OUT THE INVENTION

An embodiment of the disclosure will be described below in detail in the following order, with reference to the drawings.
1. Embodiment (an example of a projection display unit in which a detection light-source section is held to a housing through a spring, and a protrusion that protrudes outward is provided)
2. Modification Examples 1-1 to 1-3 (other configuration examples of the protrusion)
3. Modification Example 2 (an example in which a detection-light blocking mechanism in a predetermined tilting state is added)
4. Modification Example 3 (an example in which a detection-light blocking mechanism in an unused state is added)
5. Modification Example 4 (an example in which a waterproofing mechanism is added)

Embodiment

[Configuration]

FIG. 1 illustrates an appearance and a use state of a projection display unit (a projection display unit 1) according to an embodiment of the disclosure. FIG. 2A illustrates an internal configuration of the projection display unit 1. FIG. 2A and FIG. 2B each illustrate a configuration of an undersurface of the projection display unit 1. FIG. 3 illustrates a functional configuration of the projection display unit 1.

The projection display unit 1 is, for example, a projector of a type that projects an image onto a region in proximity to the projection display unit 1, in a state of being installed on a top surface of a table, desk, stand, or the like, or on a wall (a projector of a so-called ultra-short focus type). A projection plane (a plane onto which an image is projected and displayed) 110 of the projection display unit 1 is, for example, on an extension surface of an installation surface (a surface on which the projection display unit 1 is placed) 130. The projection plane 110 and the installation surface 130 form a continuous surface (FIGS. 2A, 2B and 2C). However, the projection plane 110 and the installation surface 130 are not necessarily continuous, and may be discontinuous. Further, a presence, between the projection plane 110 and the installation surface 130, of a level difference by which the installation surface 130 is higher than the projection plane 110 may be tolerable.

The projection display unit 1 has a function of actively detecting an object, while displaying an image. As will be described later in detail, a user is allowed to perform predetermined input operation, by making some kind of motion, such as touching a displayed image with a finger (an indicator 71) on a screen (a projection screen S11) onto which the image is projected (displayed), as illustrated in FIG. 1.

The projection display unit 1 includes a main body 10 and a detection light-source section 30, inside a housing 120, as illustrated in FIG. 2A. The main body 10 includes, specifically, an illuminator 11 (a visible light illuminator), a light valve 12, an imaging device 13, a reduction optical system 14, a polarized-light separation device 15, a projection lens 16, an imaging-signal processor 17, an image-signal processor 19, and a controller 20, as illustrated in FIG. 3. Of these, for example, the illuminator 11, the light valve 12, and the projection lens 16 forms a projection optical system 10A, and, for example, the imaging device 13 and the reduction optical system 14 forms a detection optical system 10B. It is to be noted that, for example, the illuminator 11, the light valve 12, and the imaging device 13 are each be driven at predetermined timings by a driver not illustrated, on the basis of control by the controller 20. A specific configuration of each component will be described below.

(Detection Light-Source Section 30)

The detection light-source section 30 is, for example, a light source section that radiates infrared rays (infrared light) such as near infrared (NIR), as invisible light for detection. The detection light-source section 30 is configured to output invisible light in a direction parallel to the projection plane 110 or a direction forming a fixed angle with respect to the projection plane 110. Here, the detection light-source section 30 is configured to radiate infrared rays along a plane (a plane parallel to the projection plane 110) at a predetermined height from the projection plane 110. In other words, the detection light-source section 30 so spreads an infrared barrier film (a detection light plane 110A) as to cover the projection plane 110, in proximity to the projection plane 110. The detection light plane 110A is formed in a plane at a predetermined height, in a region in proximity to the projection plane 110. This height is different from a height of an optical axis passing through the projection lens 16. For this reason, the detection light-source section 30 is provided below the main body 10, and is disposed at a position adjacent to or close to the installation surface 130, in a state that the projection display unit 1 is placed on the installation surface 130.

As an example, the detection light plane 110A is formed at a position at a height of, for example, a few millimeters to tens of millimeters from the projection plane 110 and have a thickness (a width in a height direction) of 2 mm to 3 mm, so as to cover the projection screen S11 in an in-plane direction. Normally, the projection plane 110 is flat, meaning that the detection light plane 110A is not blocked as long as the indicator 71 such as a finger and a pointer is absent. In other words, nothing is sensed by the imaging device 13 monitoring the projection plane 110. In this state, if an object such as a finger is brought close to the projection plane 110, or a motion such as touching the projection plane 110 with the finger is made, the infrared rays of the detection light plane 110A are blocked by the finger and then diffuse reflection occurs at that point. The light reflected off the finger goes in all directions, and a portion (infrared light La1) thereof is taken into an opening of the projection lens 16. The infrared light La1 reaches the imaging device 13 through the projection lens 16 and the polarized-light separation device 15. Here, the light valve 12 that generates an image and the imaging device 13 are disposed at optically conjugate positions. For this reason, bright-spot scattering points occurring as dots on the projection plane 110 form an image on the imaging device 13, and an image is formed on a projected image at a position corresponding to 1:1. This makes it possible to detect a position of an object. In addition, in a case of using a projection display unit of the ultra-short focus type, projection light lights up the projection plane 110 in proximity to the display unit, meaning that the projection light is less likely to be blocked by a portion of an operating person. For this reason, there is such an advantage that it is easy to view a screen during operation.

Providing the detection light plane 110A achieves such a mechanism that, when the object (the indicator 71) touches or comes near the projection plane 110, the infrared light is reflected (reflected and diffused) by the indicator 71, and the portion (the infrared light La1) of the reflected light is taken into the projection display unit 1 as detection light.

The detection light-source section 30 has a light source unit (not illustrated in FIGS. 2A, 2B and 2C) and an output port 31. The detection light-source section 30 is a light source module in which infrared rays generated in the light source unit are outputted from the output port 31. It is to be noted that the infrared rays outputted from the output port 31 are then outputted from an opening 1b (an opening) of the housing 120. FIG. 4 illustrates an example of the light source unit. For example, the light source unit (a light source unit 34) has a near-infrared laser 35, a collimator lens 36, and a cylindrical array lens 37. Infrared light (near-infrared) La outputted from the cylindrical array lens 37 forms the detection light plane 110A. As illustrated in FIG. 5A, a plurality of convex cylindrical lenses are arranged in the cylindrical array lens 37. The cylindrical array lens 37 is disposed such that a generating line 37A of the cylindrical lens faces a surface perpendicular to the projection plane 110. It is to be noted that, in place of the cylindrical array lens 37 having a convex shape, the cylindrical array lens 37 in which a plurality of concave cylindrical lenses are arranged as illustrated in FIG. 5B may be used.

In the present embodiment, the detection light-source section 30 (i.e., the output port 31) is movable relative to the housing 120, and biased from inside toward outside of the housing 120 (biased by a pressing force). Specifically, the detection light-source section 30 is held to the housing 120 through a biasing member 33. The biasing member 33 includes, for example, a spring. However, the biasing member 33 may use, for example, one or more of elastic force, magnetic force, and gravity, without being limited to the spring.

The detection light-source section 30 further has one or a plurality of (here, a plurality of) protrusions 32. Specifically, in the detection light-source section 30, the above-described light source unit is held by a chassis (a holding member), and this chassis includes the protrusions 32. Desirably, the protrusions 32 may be integrally formed with this chassis. In this case, for example, a chassis portion and the protrusions 32 are made of resin. This eliminates the necessity of considering an attachment accuracy between the protrusions 32 and the chassis, which is advantageous for further enhancement of yield and simplification of process. This also increases productivity. It is to be noted that the housing 120 has a through hole 1c corresponding to a location at which each of the protrusions 32 is formed. The protrusions 32 each protrude toward the outside of the housing 120 through the through hole 1c, in a state that the detection light-source section 30 is biased.

The protrusion 32 is provided to protrude, for example, from an undersurface of the housing 120 (the through hole 1c is provided on the undersurface of the housing 120). FIG. 2B and FIG. 2C each illustrate an example thereof. In this way, desirably, the protrusion 32 may be provided at three or more locations. In the example illustrated in FIG. 2B, the protrusion 32 is provided at each of three locations. In the example illustrated in FIG. 2C, the protrusion 32 is provided at each of four locations. In both examples, desirably, a line segment that joins two locations of the three or four locations (here, two locations on output side (front side)) may be orthogonal to an output center direction Z1 of the detection light-source section 30. In addition, desirably, the protrusion 32 may be disposed at a position closer to the output side (a position close to a front face) than a center of gravity of the entire display unit. An outside shape of each of the protrusions 32 is not particularly limited and may be any shape as long as the shape allows the protrusion 32 to protrude from the through hole 1c of the housing 120. Examples of the shape may include a cylindrical shape, a prism shape, a cone shape, and a truncated cone shape. In addition, here, the protrusions 32 each have a relatively small diameter (or width), and are each shaped like a slim pin.

The plurality of protrusions 32 each serve as a leg of the housing 120, and each include a point of contact with the installation surface 130. In addition, since the detection light-source section 30 is held to the housing 120 through the biasing member 33, a length d of a portion, which protrudes from the housing 120, of the protrusion 32 in an installed state (hereinafter referred to as an installed state (a first state)) is variable depending on a factor such as a distance between the housing 120 and the installation surface 130. Specifically, the length d is smaller than that of a protruding portion of the protrusion 32 in a state of being away from the installation surface 130 (an uninstalled state).

It is to be noted that, in the installed state, the length d of the protrusion 32 may be 0 (zero). In other words, an apex portion of the protrusion 32 may be flush with the undersurface of the housing 120, or both of the protrusion 32 and the housing 120 may be in contact with the installation surface 130. Further, the shape, size, and the number of the protrusions 32 are not limited to the examples described above. Moreover, the protrusions 32 may be identical to one another in terms of shape and size, or may include the protrusions 32 varying in shape and/or size.

(Main Body 10)

FIG. 6 illustrates an example of a key-part configuration of the main body 10. The illuminator 11 (the visible light illuminator) outputs illumination light L1 toward the light valve 12 through the polarized-light separation device 15. The illuminator 11 is not particularly limited, and is any type of illuminator as long as this illuminator outputs visible light as the illumination light L1. The illuminator 11 includes, for example, a blue laser, a green laser, and a red laser (all of which are unillustrated).

The light valve 12 is, for example, a reflection liquid crystal device such as liquid crystal on silicon (LCOS). For example, the light valve 12 modulates a first polarized component (for example, an s-polarized light component Ls1 to be described later) included in the illumination light L1, on the basis of an image signal inputted from the image-signal processor 19. A polarization state of the light modulated by the light valve 12 is turned, which results in a second polarized component (for example, a p-polarized light component Lp1 to be described later). This modulated light is outputted toward the projection lens 16 through the polarized-light separation device 15. It is to be noted that, in the light valve 12, it is possible to perform black display by returning the entering light (the s-polarized light component Ls1) to the polarized-light separation device 15 while keeping a polarization state as is. An effective area of the light valve 12 has a plane shape of, for example, a rectangle.

The projection lens 16 projects light (image light L2) entering from the light valve 12 through the polarized-light separation device 15, onto the projection plane 110. The projection lens 16 is an ultra-short focus lens having a throw ratio of, for example, 0.38 or less. Here, the throw ratio is expressed by L/H, where a distance from the projection lens 16 to the projection plane 110 is L, and a width of the projection screen S11 is H. As illustrated in FIG. 3 and FIG. 6, the detection light (the infrared light La1) enters the projection lens 16 from a direction opposite to a traveling direction of the modulated light. In this way, in the present embodiment, the detection light is taken in through the projection lens 16, and then guided to the imaging device 13.

The polarized-light separation device 15 separates the entering light into the first polarized component (for example, the s-polarized light component) and the second polarized component (for example, the p-polarized light component), and then outputs these components in directions different from each other. The polarized-light separation device 15 is configured of, for example, a polarization beam splitter (PBS). The polarized-light separation device 15 is configured to selectively reflect the first polarized component (to be reflected off a polarized-light separation plane 150), and to selectively allow the second polarized component to pass therethrough (to pass through the polarized-light separation plane 150). Here, the polarization beam splitter is given as an example of the polarized-light separation device 15, but the polarized-light separation device 15 is not limited thereto. For example, the polarized-light separation device 15 may be configured of a wire grid. In this case, in contrast to characteristics of the polarization beam splitter, it is possible to reflect the p-polarized light component selectively as the first polarized component of the entering light, and to allow the second polarized component to pass therethrough selectively.

The polarized-light separation device 15 has, for example, four optical planes (a first plane 15A, a second plane 15B, a third plane 15C, and a fourth plane 15D), and a polarized-light separation plane 150. The first plane 15A and the third plane 15C are disposed to face each other in one axial direction (a lateral direction in FIG. 6). The second plane 15B and the fourth plane 15D are disposed to face each other in one axial direction (an up-down direction in FIG. 6). In such a configuration, the illumination light L1 enters the first plane 15A, and the light valve 12 is disposed to face the second plane 15B. The detection optical system 10B is disposed to face the third plane 15C, and the projection lens 16 is disposed to face the fourth plane 15D.

FIG. 7 illustrates a configuration example of the polarized-light separation device 15. As illustrated, the polarized-light separation device 15 reflects the first polarized component (the s-polarized light component Ls1) of the illumination light L1 entering from the first plane 15A and then outputs the first polarized component from the second plane 15B. Meanwhile, the second polarized component (the p-polarized light component Lp1) of the illumination light L1 is outputted from the third plane 15C. Further, a second polarized component (a p-polarized light component Lp2) of light (light modulated by the light valve 12) entering from the second plane 15B is outputted from the fourth plane 15D. This allows image projection by the projection optical system 10A. On the other hand, a first polarized component (an s-polarized light component Ls3) of the light (the infrared light La1) entering from the fourth plane 15D is reflected and then outputted from the third plane 15C. Light based on the s-polarized light component Ls3 is received by the imaging device 13. An imaging signal D0 is thereby obtained from the imaging device 13.

The imaging device 13 is disposed at a position optically conjugate with respect to the light valve 12. To be more specific, in a case where the light valve 12 is a reflection liquid crystal device, a display surface (a liquid crystal surface) that creates an image and an imaging surface of the imaging device 13 are disposed to be optically conjugate. The imaging device 13 is configured of, for example, a solid-state imaging device such as a complementary metal-oxide semiconductor (CMOS) as a charge coupled device (CCD).

One example of the detection optical system 10B including the imaging device 13 includes, for example, a visible-light cut filter 17A, a bandpass filter 17B, the reduction optical system 14 (relay lens groups 14A and 14B), a polarizer 18, and the imaging device 13 disposed in order from side where a conjugate plane 50 is provided, as illustrated in FIG. 6.

The visible-light cut filter 17A reduces a visible light component of the entering light. Providing the visible-light cut filter 17A makes it possible to cut much of the illumination light L1 entering the imaging device 13, without turning off a light source of the illuminator 11, even if a polarization beam splitter is used as the polarized-light separation device 15. This allows substantially only the detection light to enter the imaging device 13, thereby making it possible to enhance a detection accuracy by increasing an SN ratio. It is to be noted that, here, one visible-light cut filter, namely, the visible-light cut filter 17A, is disposed. However, the number of visible-light cut filters may be two or more without being limited thereto. Further, the visible-light cut filter 17A is disposed at a position between the conjugate plane 50 and the reduction optical system 14, but may be disposed at any other position. For example, the visible-light cut filter 17A may be disposed at a position between the reduction optical system 14 and the imaging device 13.

The bandpass filter 17B selectively allows a specific wavelength (near infrared) to pass therethrough, thereby reducing other wavelengths.

The polarizer 18 is an optical member that reduces the second polarized component included in the illumination light L1. Here, the polarized-light separation device 15 as described above allows the second polarized component (for example, the p-polarized light component) of the illumination light L1 to pass therethrough. This p-polarized light component therefore enters the detection optical system 10B, and influence an S/N ratio of an imaging signal obtained in the imaging device 13. Placing the polarizer 18 as described in the present embodiment cuts the second polarized component (for example, the p-polarized light component) included in the illumination light L1, thereby making it possible to increase the S/N ratio. It is to be noted that a position of the polarizer 18 is not limited to an illustrated position between the reduction optical system 14 and the imaging device 13. The polarizer 18 may be disposed at any other position, for example, at a position between the conjugate plane 50 and the reduction optical system 14.

The reduction optical system 14 is configured of one or a plurality of relay lens groups (here, the two relay lens groups 14A and 14B). The relay lens groups 14A and 14B each have positive power and each include one or more lenses. The relay lens group 14B has a focal length fi set to be smaller than a focal length fb of the relay lens group 14A. For example, under a condition of 2 fi=fb, the relay lens group 14A is disposed at a position away from the conjugate plane 50 of the light valve 12 by the focal length fb, and the relay lens group 14B is disposed at a position away from the position of the relay lens group 14A by (fb+fi). Further, the imaging device 13 is disposed at a position away from the relay lens group 14B by the focal length fi. Thus arranging the relay lens groups 14A and 14B realizes a case equivalent to a case where the imaging device 13 is disposed on the conjugate plane 50, while achieving a reduction optical system. In other words, it is possible to reduce the size of the imaging device 13 further, while keeping a conjugate positional relationship with the light valve 12. It is to be noted that, in the present embodiment, the case where the detection optical system 10B has the reduction optical system 14 is described as an example, but the reduction optical system 14 may not be provided. In other words, the detection optical system 10B may have an enlargement optical system or an equal-magnification optical system.

The object detection using the reduction optical system 14 described above is advantageous in terms of a reduction in cost. The size of the imaging device 13 greatly influences the cost of the imaging device 13. The light valve 12 and the imaging device 13 are semiconductor components and a proportion of cost thereof is high in configuring a projector. Reducing the sizes of such components brings about a great cost advantage. In addition, there is also such an advantage that flexibility of arrangement is increased by extending a conjugate point by a relay optical system. For example, allowing a distance between components makes it possible to achieve a folding optical system using a reflecting mirror therebetween.

The imaging-signal processor 17 performs arithmetic processing on the basis of the imaging signal D0 outputted from the imaging device 13. For example, the imaging-signal processor 17 detects a position of a feature point of the indicator (the object) 71 such as a finger of a person and a pointer, by associating the position with coordinates in the projection screen S11 on the projection plane 110. Usable examples of the feature point may include a shape of a fingertip of a person, a center of gravity of a finger, and a center of gravity of a hand.

The image-signal processor 19 generates, for example, an image signal for the light valve 12, on the basis of an image signal inputted from the outside. The generated image signal is supplied to each pixel of the light valve 12 as an image voltage, through unillustrated devices such as a timing controller and a driver (a driver circuit).

In the projection display unit 1, the housing 120 has a projection opening 1a on an optical path of the projection lens 16 of the main body 10. The projection opening 1a serves both as an output port for the image light L2 and as an intake port for the infrared light La1 for detection. The housing 120 also has the opening 1b on an output optical path (an optical path for the infrared light La) of the detection light-source section 30. It is to be noted that, since the detection light-source section 30 is movable relative to the housing 120, a height of the output optical path of the detection light-source section 30 is unfixed with respect to the housing 120; however, a position and a size of the opening 1b are set to include at least the output optical path of the detection light-source section 30 in the installed state.

Workings and Effects

Workings and effects of the projection display unit 1 of the present embodiment will be described using FIG. 8 to FIG. 12B. FIG. 8 is a diagram schematically illustrating a concept of image display and object detection of the projection display unit 1. FIG. 9 is a schematic diagram illustrating an example of the uninstalled state (a state of being away from the installation surface) of the projection display unit 1. FIG. 10 is a schematic diagram illustrating an example of the installed state of the projection display unit 1. FIG. 11 is a schematic diagram illustrating a use state of the projection display unit 1. FIG. 12A and FIG. 12B are schematic diagrams for description of an effect of the projection display unit 1.

In the projection display unit 1, image information V1 formed in the light valve 12 is projected onto the projection plane 110 by the projection lens 16, and displayed in an expanded state as a projected image V2, as illustrated in FIG. 8. Meanwhile, the projection display unit 1 detects, by using the imaging signal D0 obtained from the imaging device 13, the position of the indicator 71, for example, a position Pt1 of a feature point of an object such as a finger of a person and a pointer, on the basis of the infrared light La1 derived from the indicator (the object) 71 on the projection plane 110.

It is to be noted that the projection lens 16 is shared by the projection optical system 10A and the detection optical system 10B, and the imaging device 13 is disposed at the position optically conjugate with respect to the light valve 12. For this reason, it is possible to perform the object detection in which an area substantially the same as the projection screen S11 serves as a detection area. In addition, this optically conjugate positional relationship makes it possible to perform monitoring of the position Pt1 of the feature point of the indicator 71 on the projection plane 110, by superimposing the position Pt1 of the feature point of the indicator 71 on the projected image V2 through the projection lens 16. Moreover, for example, the imaging-signal processor 17 performs image processing on the shape of the indicator 71 and detects coordinates of the position Pt1 of the feature point of the indicator 71 to allow for a pointing operation on the projected image V2. Here, a coordinate position of the projection screen S11 and a coordinate position of the imaging device 13 are in a one-to-one correspondence, meaning that coordinates of a detection position Pt2 on the imaging device 13 side correspond to the coordinates of the position Pt1 of the feature point of the indicator 71. In other words, it is possible to detect the object by defining a correspondence between the detection position Pt2 and the position within the projection screen S11, without performing complicated signal processing such as calibration. It is to be noted that the presence of two or more indicators 71 is tolerable, meaning that it is possible to detect, for example, coordinates of a fingertip of each of both hands. Using the thus detected position of the feature point of the indicator 71 makes is possible to perform an intuitive operation as if a touch panel is built in the projected image V2 of the projector.

Here, in the present embodiment, the detection light-source section 30 is configured to be movable relative to the housing 120, and to output the infrared light in a direction parallel to the projection plane 110. Specifically, the detection light-source section 30 is biased in a direction from the inside toward the outside of the housing 120, and has the protrusions 32 that protrude from the housing 120 toward the outside in this biased state. In other words, in a state that the projection display unit 1 is away from the installation surface 130, the detection light-source section 30 is held in a state that the protrusions 32 protrude from the housing 120 by a length d1 owing to the biasing force of the biasing member 33, as illustrated in FIG. 9.

Referring to FIG. 10, when the projection display unit 1 is placed on the installation surface 130 (in the installed state), for example, the biasing member 33 shrinks owing to the weight of the main body 10 and the housing 120, and the detection light-source section 30 shifts in an inward direction (in an upward direction in FIG. 10) of the housing 120 from a position illustrated in FIG. 9. Accordingly, a length d2 of the protruding portion protruding from the housing 120 of the protrusion 32 is reduced (d2<d1). It is to be noted that in a case where the installation surface 130 is flat and there is no factor such as an attachment error between the housing 120 and the detection light-source section 30, the length d2 takes a minimum value.

In use, while the main body 10 performs the image display on the projection plane 110 and the object detection, the infrared light La is outputted from the output port 31 of the detection light-source section 30 to form the detection light plane 110A, in the installed state as illustrated in FIG. 11. At this time, the infrared light La (the detection light plane 110A) outputted from the detection light-source section 30 is radiated in a direction parallel to the projection plane 110, at a position of a height H from the projection plane 110. In this way, desirably, the infrared light La may be radiated, for example, in the direction parallel to the projection plane 110.

However, in fact, there is an error between geometries and designed values of components such as the housing 120, and attachment accuracy between the housing 120 and the detection light-source section 30 also varies, in a manufacturing process. For this reason, in many cases, assembling is performed while making adjustments by taking such geometries of components, an attachment accuracy, and the like into consideration in an existing manufacturing process. However, such a technique demands precise geometries of components, thereby reducing yield and increasing cost. In addition, performing an adjustment work during attachment increases the number of work processes. Besides, the number of components that causes such variations in accuracy is large, making the adjustment work difficult.

In contrast, in the present embodiment, for example, the detection light-source section 30 is biased toward the outside of the housing 120, and has the protrusions 32 that protrude toward the outside of the housing 120 in this biased state. The protrusions 32 therefore each become the point of contact with the installation surface 130, and a distance (a height) between the detection light-source section 30 and the installation surface 130 is kept constant, irrespective of the geometry of the housing 120 or the attachment accuracy between the housing 120 and the detection light-source section 30. The detection light-source section 30 (the output port 31) is therefore disposed at an appropriate position on the installation surface 130. In other words, an output direction of the infrared light La (an irradiation plane direction of the detection light plane 110A) is less likely to depend on the geometry of the housing 120 or the attachment accuracy between the housing 120 and the detection light-source section 30.

It is to be noted that the output direction of the infrared light La and the height H are determined by a length (a height) of the protrusion 32 and a state of the installation surface 130. For this reason, it is not necessary to consider the geometry of the housing 120 or the attachment accuracy between the housing 120 and the detection light-source section 30. Only ensuring attachment accuracy between the detection light-source section 30 and the protrusion 32 is sufficient. However, in the present embodiment, it is also not necessary to consider the attachment accuracy between the detection light-source section 30 and the protrusion 32 (adjustment being unnecessary). This is because the detection light-source section 30 and the protrusion 32 are integrally formed, and it is therefore not necessary to perform attachment processes therefor. Hence, this is advantageous for simplification of process and enhancement of yield.

Specifically, as illustrated in FIG. 12A, assume that, for example, an error occurs between the geometry and the designed values of the housing 120, and a slope A1 is formed at a bottom. Even in this case, the detection light-source section 30 is disposed at an appropriate position on the installation surface 130 by using the protrusions 32 each as a point of contact, without following a shape of the slope A1 of the housing 120. Hence, the infrared light La is outputted in a direction parallel to the projection plane 110, as with the case illustrated FIG. 10 and FIG. 11. There is also other advantage as follows. For example, in a case where a bump A2 such as an obstacle and an uneven portion is present on the installation surface 130 and the housing 120 runs onto the bump A2, the housing 120 is disposed while tilting, as illustrated in FIG. 12B. In this case as well, the detection light-source section 30 is disposed at an appropriate position on the installation surface 130 by using the protrusions 32 each as a point of contact, without following tilting of the housing 120. Hence, the infrared light La is outputted in a direction parallel to the projection plane 110, as with the case illustrated FIG. 10 and FIG. 11.

This makes it easy to radiate the infrared light La in a desirable direction, without considering the attachment accuracy between the housing 120 and the detection light-source section 30 in a manufacturing process, in the present embodiment.

As described above, according to the present embodiment, it is possible to detect a touch input or the like by using the infrared light La radiated from the detection light-source section 30, while displaying an image on the projection plane 110 by using the visible light. The detection light-source section 30 is configured to be movable relative to the housing 120, and to output the infrared light La in the direction parallel to (or the direction forming a fixed angle with) the projection plane 110. This makes it possible to radiate the infrared light La in a desirable direction, without considering the attachment accuracy between the housing 120 and the detection light-source section 30. It is therefore possible to simplify the manufacturing process and to enhance the yield.

Next, modification examples of the above-described embodiment will be described. Same components as those of the above-described embodiment are provided with same reference numerals as those of the above-described embodiment, and description thereof is omitted as appropriate.

Modification Examples 1-1 to 1-3

FIG. 13A is a schematic diagram illustrating a configuration of a protrusion of the detection light-source section 30 according to a modification example 1-1. FIG. 13B is a schematic diagram illustrating a configuration of a protrusion of the detection light-source section 30 according to a modification example 1-2. FIG. 13C is a schematic diagram illustrating a configuration of a protrusion of the detection light-source section 30 according to a modification example 1-3. The configuration of the protrusion of the detection light-source section 30 is not limited to the above-described configuration of the protrusion 32. For example, as with the modification example 1-1 illustrated in FIG. 13A, the protrusion 32 may have a relatively large diameter (or width). Further, as with the modification example 1-2 illustrated in FIG. 13B, a plate-shaped member 32B2 may be further coupled to a protrusion 32B1. Furthermore, as with the modification example 1-3 illustrated in FIG. 13C, a tip of a protrusion 32C may have a spherical surface 32c1. In each of these modification examples 1-1 to 1-3, it is possible to obtain an effect similar to that in the above-described embodiment, and further to address a state of the installation surface 130 with flexibility. For example, stable installation on a soft carpet, a mesh-shaped sheet, or the like is possible. Moreover, the protrusion 32C has the spherical surface 32c1 as with the example illustrated in FIG. 13C, making it difficult to catch an obstacle on the installation surface 130.

Modification Example 2

FIG. 14 is a schematic diagram illustrating a configuration of a projection display unit according to a modification example 2. In the present modification example, the housing 120 is configured to block the output optical path of the detection light-source section 30 in a predetermined tilting state. Specifically, the housing 120 has an opening 1$b$1 on the output optical path of the detection light-source section 30 in the installed state, as with the above-described embodiment. However, the opening 1$b$1 is located not to include the output optical path of the detection light-source section 30 in a predetermined tilting state. For example, a factor such as a position and a size of the opening 1$b$1 is set such that, in a case where an angle (an angle $\alpha$) formed with the installation surface 130 is equal to or less than a predetermined angle serving as a threshold, the output optical path of the detection light-source section 30 passes through the opening 1$b$1, but is blocked by the housing 120 in a case where the angle $\alpha$ is greater than the threshold.

As with the present modification example, a limitation may be provided to an inclination of the housing 120 at which the infrared light La is allowed to output. This makes it possible to prevent the infrared light La from going out inadvertently in a case where, for example, the housing 120 is installed while tilting.

Modification Example 3

FIG. 15 is a schematic diagram illustrating a configuration of a projection display unit according to a modification example 3. In the present modification example, the housing 120 is configured to block the output optical path of the detection light-source section 30, in a state of being away from the installation surface 130. Specifically, the detection light-source section 30 is held to the housing 120 by biasing members 33A1 and 33A2, in a state of tilting relative to the housing 120 beforehand. In this state, the protrusion 32 protrudes from the housing 120 toward the outside through the through hole 1$c$. In addition, the housing 120 has an opening 1$b$2 on the output optical path of the detection light-source section 30 in the installed state, as with the above-described embodiment. However, the opening 1$b$2 is located not to include the output optical path of the detection light-source section 30 in a state of being away from the installation surface 130. In other words, the output optical path of the detection light-source section 30 in the state of being away from the installation surface 130 is blocked by the housing 120.

As with the present modification example, the output optical path of the detection light-source section 30 may be blocked by the housing 120 when the detection light-source section 30 is held while tilting in the state of being away from the installation surface 130. This makes it possible to prevent the infrared light La from going out when carrying, etc.

Modification Example 4

FIG. 16 and FIG. 17 are schematic diagrams each illustrating a configuration of a portion near the protrusion 32 of the detection light-source section, according to a modification example 4. FIG. 16 illustrates a configuration in a state of being away from the installation surface 130, whereas FIG. 17 illustrates a configuration in an installed state. In the above-described embodiment, the protrusion 32 is described as protruding toward the outside through the through hole 1c of the housing 120, but moisture and the like may enter through the through hole 1c. For this reason, a waterproofing mechanism as in the present modification example may be added to the projection display unit. It is to be noted that, in the example illustrated in FIG. 16 and FIG. 17, the protrusion 32 is integrally formed with a holding member (a light source section chassis 30A) of the light source unit. The biasing member 33 includes a flat spring, and fixed to the housing 120. In such a configuration, a waterproofing supporting member 38 is so provided on a surface S1 near the through hole 1c inside the housing 120 as to surround the protrusion 32. The waterproofing supporting member 38 is configured of, for example, an elastic member such as rubber, and has a function of sealing the inside of the housing 120 and supporting the protrusion 32. Hence, the detection light-source section 30 is biased by the biasing member 33 in a direction toward the outside of the housing 120, and biased by the waterproofing supporting member 38 in a direction toward the inside of the housing 120. However, biasing force exerted by the biasing member 33 exceeds that of the waterproofing supporting member 38, and the detection light-source section 30 is therefore biased toward the outside of the housing 120 as a whole.

In the present modification example, the detection light-source section 30 is so held by the biasing force of the biasing member 33 that the protrusion 32 protrudes from the housing 120 by the length d1 as illustrated in FIG. 16, in the state of being away from the installation surface 130. On the other hand, as illustrated in FIG. 17, the biasing member 33 shrinks (the waterproofing supporting member 38 extends) and the detection light-source section 30 shifts in an inward direction of the housing 120 further than a position illustrated in FIG. 16 in the installed state. Accordingly, the length d2 of the protruding portion, which protrudes from the housing 120, of the protrusion 32 is reduced (d2<d1). It is therefore possible to obtain an effect equivalent to that of the above-described embodiment, and to enhance sealing performance in the inside of the housing 120.

The disclosure is described above by referring to the embodiment and the modification examples, but is not limited to the embodiment and the like and is variously modifiable. For example, in the above-described embodiment, the case where the detection light-source section 30 is configured to output the invisible light in the direction parallel to the projection plane 110 is described as an example, but the output direction of the invisible light is not limited thereto. For example, the invisible light may be outputted in a fixed angle direction (a tilting direction) with respect to the projection plane 110, depending on an application of the projection display unit.

Further, in the above-described embodiment, the configuration in which the detection light-source section 30 is held to the housing 120 through the biasing member 33 such as a spring is described, but the detection light-source section 30 may be biased utilizing a component originally provided in the detection light-source section 30. For example, in many cases, the detection light-source section 30 has a flexible substrate (a flexible substrate) on which an IC circuit for driving, wiring, etc., are formed; hence, an end of the flexible substrate is extended to allow this extension portion to be folded on the detection light-source section 30 and placed next to the housing 120. This makes it possible to apply biasing force similar to force derived from a spring.

Furthermore, in the above-described embodiment, the configuration in which the detection light-source section 30 is held in the state of being biased and has the protrusion is described as an example, but a configuration of the disclosure is not limited thereto. For example, the detection light-source section 30 may be held to the housing 120 in a state of being fixed to the housing 120, and may further include an optical-path conversion device such as a mirror. Placing the optical-path conversion device to be a point of contact with the installation surface makes it possible to achieve a configuration in which the invisible light is outputted in a direction parallel to the projection plane 110 or a direction forming an angle with the projection plane 110, even if the detection light-source section 30 is fixed to the housing 120. It is to be noted that the "parallel" direction as used herein is not limited to the literal meaning of the word "parallel", and may be a direction proceeding in a plane at an almost same height as the height of the projection plane 110, in a region covering at least the projection screen.

Moreover, in the above-described embodiment, the reflection liquid crystal device is used as the light valve of the disclosure. This is, however not limitative and any other light valve may be used. For example, a micro electro mechanical systems (MEMS) device including one or a plurality of mirrors may be used as the light valve.

Example of the device using a plurality of mirrors may include a digital mirror device (DMD) in which a plurality of micro-mirrors arranged two-dimensionally are used as a display device. In the DMD, the light valve is of a mirror type not utilizing a polarization property of light, and thus a polarized light optical system is not usually used. However, the light valve may be placed in an optical system in which a polarized-light separation device such as a polarization beam splitter is disposed on an optical path as in the above-described embodiment, making it possible to achieve image display by means of the DMD.

Examples of the device using a single mirror may include a device that utilizes a so-called laser scanning method. The laser scanning method is a method of driving the single mirror used as the light valve. By driving the single mirror, the laser scanning method performs scanning of a laser beam (a dot) outputted from a visible light illuminator (a semiconductor laser) and allows reflected light of the laser beam to be drawn on a screen (a projection plane), thereby displaying an image. The MEMS device using such a laser scanning method allows for elimination of the projection lens described above in the embodiment and focus-free image display. In addition, the light valve and the imaging device may not be optically conjugate. The disclosure is applicable to such a device that includes an optical system using no projection lens.

Furthermore, in the above-described embodiment, the so-called ultra-short focus projection display unit is given as an example of the projection display unit of the disclosure. The projection display unit, however, is not necessarily limited thereto. The disclosure is applicable to a display unit having such a configuration that a projection optical system and a detection optical system share a projection lens, and an imaging device is disposed at a position optically conjugate with respect to a light valve. However, as described above, in a case where the MEMS device using the single mirror as the light valve is employed, the imaging device and the light valve may not be optically conjugate. It is to be noted that the effects described in the above-described embodiments, etc., are mere examples without being limitative, and other effects may also be provided.

For example, the disclosure may adopt the following configurations.

(1) A projection display unit including, in a housing:
  a visible light illuminator;
  a light valve that modulates a first polarized component included in light outputted from the visible light illuminator, on a basis of an image signal;
  a projection lens that projects light modulated by the light valve onto a projection plane;
  a detection light-source section that outputs invisible light for detection; and
  an imaging device that receives a second polarized component included in light that is based on the invisible light,
  the detection light-source section being movable relative to the housing, and outputting the invisible light in a direction parallel to the projection plane or a direction forming a fixed angle with respect to the projection plane.
(2) The projection display unit according to (1), in which the detection light-source section outputs the invisible light in the direction parallel to the projection plane.
(3) The projection display unit according to (1) or (2), in which
  the housing has one or a plurality of through holes on a surface that faces the detection light-source section, and
  the detection light-source section is biased from inside toward outside of the housing, and has a protrusion that protrudes, in a biased state, to the outside of the housing through the one or the plurality of through holes.
(4) The projection display unit according to (3), in which the protrusion is provided at three or more locations.
(5) The projection display unit according to (4), in which
  the protrusion is provided at the three locations, and
  a line segment that joins two locations among the three locations is orthogonal to an output center direction of the invisible light.
(6) The projection display unit according to any one of (3) to (5), in which
  the detection light-source section includes a light source unit and a holding member that holds the light source unit, and
  the protrusion is formed integrally with the holding member.
(7) The projection display unit according to any one of (3) to (6), in which the protrusion includes a point of contact that comes into contact with the installation surface, in a first state as a state of being placed on the installation surface.
(8) The projection display unit according to (7), in which a length of a portion, protruding from the protrusion, of the protrusion in the first state is smaller than a length of the protruding portion of the protrusion in a second state as a state of being away from the installation surface.
(9) The projection display unit according to (8), in which the housing has an opening on an output optical path of the detection light-source section in the first state.
(10) The projection display unit according to (9), in which the output optical path of the detection light-source section, in a state in which the housing is installed while tilting at a fixed angle or an angle greater than the fixed angle, is blocked by the housing.
(11) The projection display unit according to (9), in which the output optical path of the detection light-source section in the second state is blocked by the housing.
(12) The projection display unit according to any one of (3) to (11), in which a tip of the protrusion has a spherical surface.
(13) The projection display unit according to any one of (3) to (11), in which the protrusion is coupled to a plate-shaped member.
(14) The projection display unit according to any one of (3) to (13), in which the protrusion is provided at a position closer to light output side than an own center of gravity.
(15) The projection display unit according to any one of (3) to (14), in which the detection light-source section is biased by one or more of elastic force, magnetic force, and gravity.
(16) The projection display unit according to (15), in which
  the detection light-source section has a flexible substrate, and
  the detection light-source section is biased by the flexibility substrate.
(17) The projection display unit according to any one of (1) to (16), in which the projection lens is a short focus lens.
(18) The projection display unit according to any one of (1) to (17), in which the light valve includes a plurality of micro-mirrors.
(19) A projection display unit including, in a housing:
  a visible light illuminator;
  a light valve that modulates a first polarized component included in light outputted from the visible light illuminator, on a basis of an image signal;
  a projection lens that projects light modulated by the light valve onto a projection plane;
  a detection light-source section that outputs invisible light for detection;
  an imaging device that receives a second polarized component included in light that is based on the invisible light; and
  an optical-path conversion device that converts an optical path of the invisible light outputted from the detection light-source section, the optical-path conversion device being movable relative to the housing, and outputting the invisible light in a direction parallel to the projection plane or a direction forming a fixed angle with respect to the projection plane.

The present application is based on and claims priority from Japanese Patent Application No. 2014-261929 filed with the Japan Patent Office on Dec. 25, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A projection display unit, comprising:
  in a housing:

a visible light illuminator;
a light valve configured to modulate a first polarized component, included in light outputted from the visible light illuminator, based on an image signal;
a projection lens configured to project light modulated by the light valve onto a projection plane;
a detection light-source section configured to output invisible light for detection; and
an imaging device configured to receive a second polarized component included in light that is based on the invisible light, wherein
the detection light-source section is movable relative to the housing, and
the detection light-source section is further configured to output the invisible light in one of a direction parallel to the projection plane or a direction that is at a fixed angle with respect to the projection plane,
the housing comprises at least one through hole on a surface that faces the detection light-source section,
the detection light-source section is biased from inside toward outside of the housing, and
the detection light-source section comprises a protrusion that protrudes, in a biased state, to the outside of the housing through the at least one through hole.

2. The projection display unit according to claim 1, wherein the detection light-source section is further configured to output the invisible light in the direction parallel to the projection plane.

3. The projection display unit according to claim 1, wherein the protrusion is at least at three locations.

4. The projection display unit according to claim 3, wherein
the protrusion is at the three locations, and
a line segment that joins two locations among the three locations is orthogonal to an output center direction of the invisible light.

5. The projection display unit according to claim 1, wherein
the detection light-source section includes a light source unit and a holding member configured to hold the light source unit, and
the protrusion is integral to the holding member.

6. The projection display unit according to claim 1, wherein the protrusion includes a point of contact that comes into contact with an installation surface, in a first state in which the protrusion is placed on the installation surface.

7. The projection display unit according to claim 6, wherein a length of a portion, that protrudes from the protrusion, of the protrusion in the first state is smaller than a length of the portion of the protrusion in a second state in which the protrusion is away from the installation surface.

8. The projection display unit according to claim 7, wherein the housing comprises an opening on an output optical path of the detection light-source section in the first state.

9. The projection display unit according to claim 8, wherein the output optical path of the detection light-source section, in a state in which the housing is installed while the housing is tilted at a fixed angle or an angle greater than the fixed angle, is blocked by the housing.

10. The projection display unit according to claim 8, wherein the output optical path of the detection light-source section in the second state is blocked by the housing.

11. The projection display unit according to claim 1, wherein a tip of the protrusion has a spherical surface.

12. The projection display unit according to claim 1, wherein the protrusion is coupled to a plate-shaped member.

13. The projection display unit according to claim 1, wherein the protrusion is at a position closer to light output side than a center of gravity of the projection display unit.

14. The projection display unit according to claim 1, wherein the detection light-source section is biased by at least one of elastic force, magnetic force, or gravity.

15. The projection display unit according to claim 14, wherein
the detection light-source section comprises a flexible substrate, and
the detection light-source section is biased by the flexibility substrate.

16. The projection display unit according to claim 1, wherein the projection lens comprises a short focus lens.

17. The projection display unit according to claim 1, wherein the light valve includes a plurality of micro-mirrors.

18. A projection display unit, comprising:
in a housing:
a visible light illuminator;
a light valve configured to modulate a first polarized component, included in light outputted from the visible light illuminator, based on an image signal;
a projection lens configured to project light modulated by the light valve onto a projection plane;
a detection light-source section configured to output invisible light for detection;
an imaging device configured to receive a second polarized component included in light that is based on the invisible light; and
an optical-path conversion device configured to convert an optical path of the invisible light outputted from the detection light-source section, wherein
the optical-path conversion device is movable relative to the housing,
the detection light-source section is further configured to output the invisible light in one of a direction parallel to the projection plane or a direction that is at a fixed angle with respect to the projection plane,
the housing comprises at least one through hole on a surface that faces the detection light-source section,
the detection light-source section is biased from inside toward outside of the housing, and
the detection light-source section comprises a protrusion that protrudes, in a biased state, to the outside of the housing through the at least one through hole.

19. A projection display unit, comprising:
in a housing:
a visible light illuminator;
a light valve configured to modulate a first polarized component, included in light outputted from the visible light illuminator, based on an image signal;
a projection lens configured to project light modulated by the light valve onto a projection plane;
a detection light-source section configured to output invisible light for detection; and
an imaging device configured to receive a second polarized component included in light that is based on the invisible light, wherein
the detection light-source section is movable relative to the housing, the detection light-source section is further configured to output the invisible light in one of a direction parallel to the projection plane or a direction that is at a fixed angle with respect to the projection plane, the housing comprises at least one through hole on a surface that faces the detection light-source section, the detection light-source section is biased from inside toward outside of the housing, and the detection light-source section comprises a protrusion that protrudes, in a biased state, to the outside of the housing through the at least one through hole, and a tip of the protrusion has a spherical surface.

* * * * *